(12) United States Patent
Davis

(10) Patent No.: US 8,487,779 B2
(45) Date of Patent: Jul. 16, 2013

(54) SUBSEA ELECTRONIC MODULE

(75) Inventor: Julian R. Davis, Bristol (GB)

(73) Assignee: Vetco Gray Controls Limited, Bristol (GB)

(*) Notice: Subject to any disclaimer, the term of this patent is extended or adjusted under 35 U.S.C. 154(b) by 0 days.

(21) Appl. No.: 12/640,220

(22) Filed: Dec. 17, 2009

(65) Prior Publication Data

US 2010/0156662 A1    Jun. 24, 2010

(30) Foreign Application Priority Data

Dec. 18, 2008  (GB) .................................. 0823009.6

(51) Int. Cl.
*G01V 3/00* (2006.01)

(52) U.S. Cl.
USPC ..................... 340/855.3; 340/853.3; 166/338; 166/316; 166/72

(58) Field of Classification Search
USPC .......... 340/853.2–853.3, 854.8, 855.1, 855.3; 175/26–27; 166/338, 54.6, 72, 318, 316; 370/389

See application file for complete search history.

(56) References Cited

U.S. PATENT DOCUMENTS

| | | | |
|---|---|---|---|
| 7,200,176 B1* | 4/2007 | Paulos et al. | 375/257 |
| 7,261,162 B2* | 8/2007 | Deans et al. | 166/336 |
| 2003/0227347 A1 | 12/2003 | Simon et al. | |
| 2007/0291535 A1 | 12/2007 | Eberle et al. | |
| 2010/0127566 A1* | 5/2010 | Biester et al. | 307/18 |
| 2010/0202463 A1* | 8/2010 | Robinson | 370/400 |
| 2010/0220773 A1* | 9/2010 | Carter et al. | 375/222 |

FOREIGN PATENT DOCUMENTS

| | | |
|---|---|---|
| DE | 4426908 B4 | 2/1996 |
| EP | 1701384 A1 | 9/2006 |
| WO | WO0180443 A1 | 10/2001 |
| WO | WO 2008020152 A1 * | 2/2008 |

OTHER PUBLICATIONS

Search Report issued on GB0823009.6; Mar. 23, 2009.
ABB Offshore Systems, "Overview of Subsea Electronics Module (SEM) Capabilities," Lombito Tomboco Presentation, Jun. 3, 2003.

* cited by examiner

*Primary Examiner* — Albert Wong
(74) *Attorney, Agent, or Firm* — Bracewell & Giuliani LLP

(57) ABSTRACT

An electronic module for use as a subsea electronic module for an underwater fluid extraction well, wherein a local area network enables communication within the module, the local area network including a plurality of interfaces with components of the network, and wherein the interfaces comprise capacitive coupling interfaces.

12 Claims, 3 Drawing Sheets

SUBSEA ELECTRONIC MODULE

RELATED APPLICATIONS

This application claims priority from United Kingdom Application 0823009.6 filed Dec. 18, 2008.

FIELD OF THE INVENTION

This invention relates to a subsea electronic module for an underwater fluid extraction well, and a method of enabling Ethernet communication therefor.

BACKGROUND OF THE INVENTION

The control of an underwater fluid extraction well, such as a hydrocarbon extraction well, is typically managed by a subsea electronic module (SEM) housed in a subsea control module (SCM), itself mounted on a subsea "Xmas tree" located on the sea bed above the fluid extraction well. Existing SEMs contain a number of printed wiring boards or cards which perform dedicated functions, such as the operation of hydraulic directional control valves (DCVs). Communication to and from the SEM is enabled via a modem if there are copper links, or an equivalent optical modem if optical links are employed. Modern SEMs utilise Ethernet communication between the electronic cards, which requires Ethernet switches to be mounted on the circuit boards. Typically, the electronic cards are arranged in sets as a 'bay', with a number of bays within the SEM. Further Ethernet switches are required to enable communication between the bays. Consequently, a large number of interfaces is required between all the Ethernet components, which components typically include switch blades. These interfaces are conventionally effected by transformers. However, transformers are expensive and consume significant space on the SEM electronic cards, which limits the functions available in an SEM whose dimensions are strictly limited by well operator customers.

It is an aim of the present invention to remove the need for transformers as SEM Ethernet component interfaces.

This aim is achieved by replacing the Ethernet component interface transformers with capacitive couplings, e.g. capacitances such as capacitors. Although the use of capacitors instead of transformers is a known technique, it is rarely employed, as there are severe restrictions on transmission distances compared to the transformer case. Thus capacitive coupling is not generally a viable option in Ethernet systems, and so transformers are standard, including for SEMs.

However, in accordance with the present invention, capacitive coupling is made viable through re-organisation of the cards within an SEM to ensure that transmission distances are small. This brings about major benefits in terms of cost and weight reduction, as well as allowing the functional repertoire of the SEM to be increased.

SUMMARY OF THE INVENTION

The present invention therefore provides various advantages, including:
a) Additional space is provided on the electronic cards for well control and monitoring functions which are the primary purposes of the SEM;
b) The cost of components is reduced in the Ethernet communication system;
c) Power consumption is reduced compared to prior art magnetic coupling, particularly if FX PHY(s) are employed as line drivers, as these devices have low quiescent power consumption (when compared to a PHY suitable for driving a magnetically coupled interface) but have adequate capacity to drive a capacitively coupled LAN;
d) Reduced dissipation results in lower component temperature, which in turn leads to enhanced component longevity and reliability;
e) Due to the reduced power consumption, it is possible to employ system umbilicals having smaller cross-section conductors, lowering costs;
f) The weight of the SEM is reduced, consequently reducing handling costs;
g) Enhanced EMC (electromagnetic compatibility) performance (Reduced LAN emissions & susceptibility); and
h) Enhanced speed performance (Controlled track routing).

In accordance with a first aspect of the present invention there is provided an electronic module for use as a subsea electronic module for an underwater fluid extraction well, wherein a local area network enables communication within the module, the local area network including a plurality of interfaces with components of the network, and wherein the interfaces comprise capacitive coupling interfaces.

In accordance with a second aspect of the present invention there is provided an electronic module for use as a subsea electronic module for an underwater fluid extraction well, comprising a plurality of substantially planar electronics cards, wherein the cards are arranged in a stack such that the major faces of each card are substantially parallel to, and coaxial with, major faces of the other cards in the stack, and wherein the module further comprises a substantially planar switch card orientated relative to the stack such that its major faces are substantially parallel to the axis of the stack and orthogonal to the major faces of the cards within the stack and positioned such that the switch card is substantially equidistant from each card within the stack.

In accordance with a third aspect of the present invention there is provided a method of enabling Ethernet communication between Ethernet components within a subsea electronic module for an underwater fluid extraction well, comprising the step of providing Ethernet interfacing between said components, said interfacing comprising a capacitance.

BRIEF DESCRIPTION OF THE DRAWINGS

The invention will now be described, by way of example, with reference to the accompanying drawings, in which:—

DETAIL DESCRIPTION OF THE INVENTION

Figure 1:
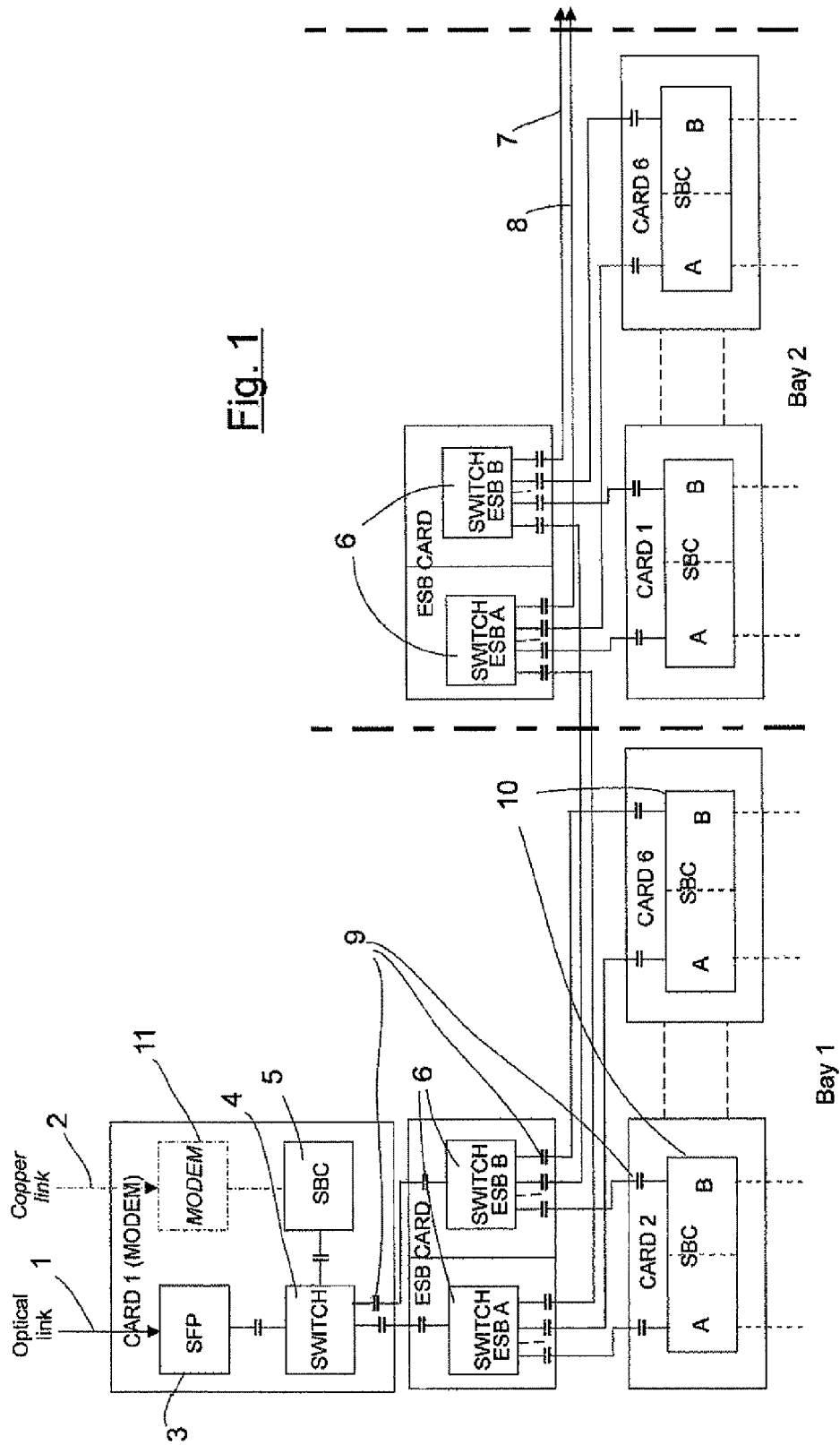
FIG. 1 schematically shows a subsea electronic module functionality in accordance with the present invention.

FIG. 1 shows an example of a configuration of an Ethernet communication system within a multi-card, multi-bay SEM, in accordance with the present invention. In FIG. 1, interfaces for both an optical external interface 1 and a copper external interface 2 to the well control platform are shown. In practice, only one interface would be used, as described below. The selection of optical or copper interfaces 1, 2 is made to enable the SEM to be compatible with the form of interface required for a particular installation. In both cases, the interface connects to a first card ("CARD 1") within the SEM, which comprises an Ethernet switch 4 capacitively coupled to a single board computer (SBC) 5.

If an optical interface 1 is used, this is connected to a small form-factor pluggable transceiver (SFP) 3, which acts as a media converter extending the topside LAN down to the SEM internal LAN(s) via an optical point to point Ethernet link, and thus provides an optical to electrical interface to the Ethernet switch 4. Modem 11 shown in FIG. 1 would not be present.

If however a copper interface 2 is used, this is connected via a modem 11 to the SBC 5. Here the SBC 5 supports the modem 11 and implements a bridge and interpreter/translator function for the modem communications.

SBC 5 is connected to Ethernet switch 4, and so may handle communications to and from either external interface 1 or 2. Ethernet switch 4 is a managed switch capable of implementing key level three protocol router functions including Spanning Tree Protocol (STP) to ensure that no LAN loops are created between the SEM internal LANs (A and B—see below) and traffic management including bandwidth assignment and prioritization.

The configuration of the SEM shown has a number of bays each with a stack of six electronic cards. In FIG. 1, only three cards (i.e. CARD 1, CARD 2 and CARD 6) are shown. In addition, only two bays of cards are shown for simplicity (i.e. Bay 1 and Bay 2), with extension of the system being provided by additional interfaces 7 and 8 for additional bays.

The SEM shown supports two internal LANs A and B, providing redundancy. Traffic on LANs A and B are routed and managed via switch 4. The LANs A and B are segregated to assure single point failure tolerance.

An ESB card of each bay includes a pair of Ethernet switch blades (ESBs) 6, denoted ESB A and ESB B, controlling LAN A and B traffic respectively. Each ESB 6 is an um-managed eight-port Ethernet switch, with six ports assigned for connection to bay-mounted cards (i.e. CARD 1-CARD 6) and two ports assigned for bay to bay connectivity. In FIG. 1 only four ports are shown connected. The Ethernet switch blades (ESBs) 6 of each CARD 1 are arranged in a dual configuration to provide system redundancy. Each ESB card is located above and orthogonal to the respective stack of six cards of the bay, as shown in FIG. 2.

Each card (i.e. CARD 1-CARD 6) includes an SBC 10 which feeds electrical drivers to operate devices in the SEM, such as directional control valves (DCVs) and/or other electrical devices and also interface with monitoring sensors on the well tree. For simplicity, these drivers, devices and interfaces are not shown in FIG. 1. Each SBC 10 interfaces to both A and B function ESBs 6, and Ethernet ports A and B are processed separately within the SBC.

Capacitive coupling between the ESBs 6 and the SBCs 10 and switch 4 is enabled by a multiplicity of capacitances 9 provided on the respective cards.

Figure 2A:
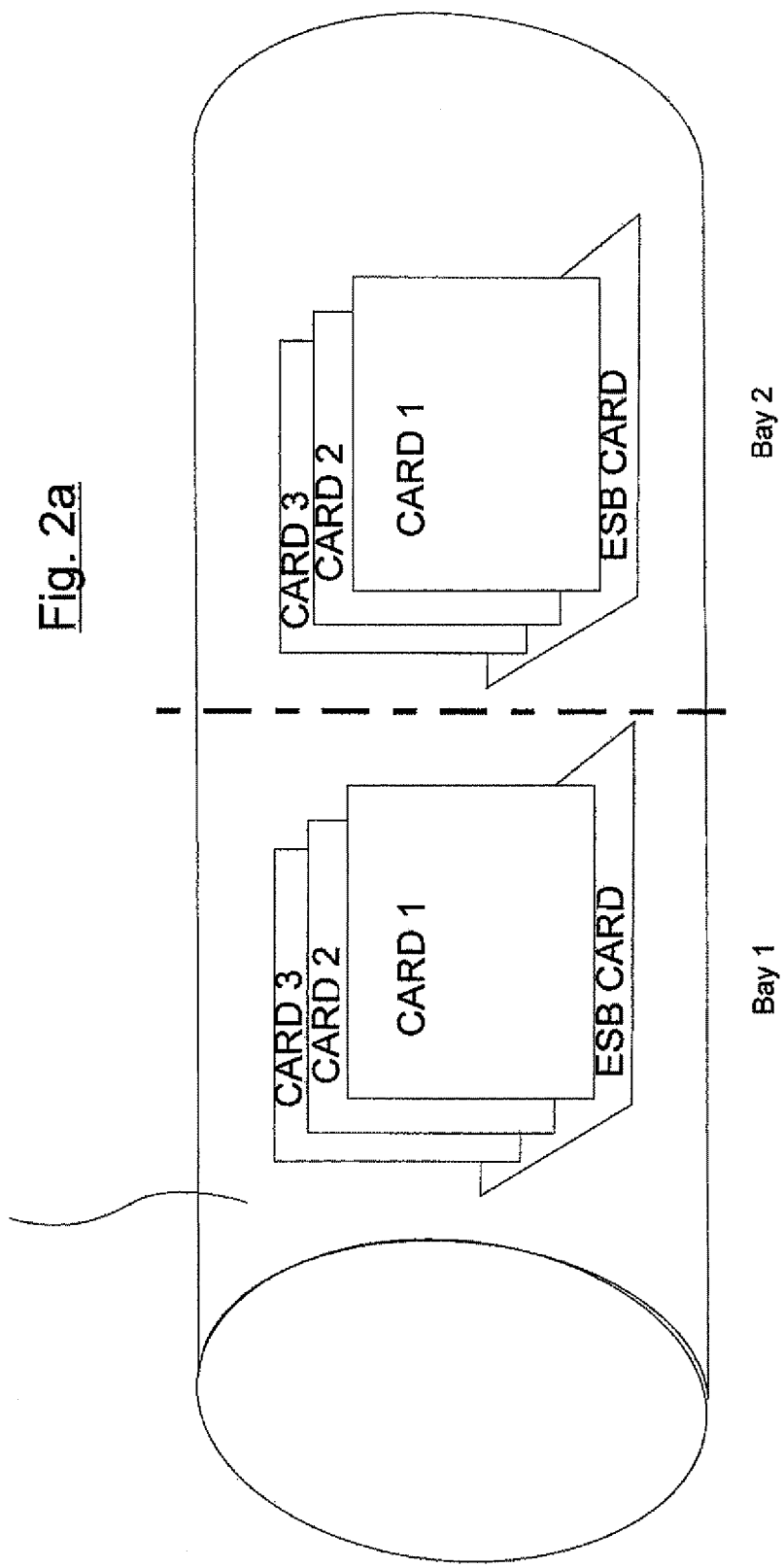
FIG. 2*a* schematically shows a physical arrangement of cards within an SEM in accordance with the present invention.
Figure 2B:
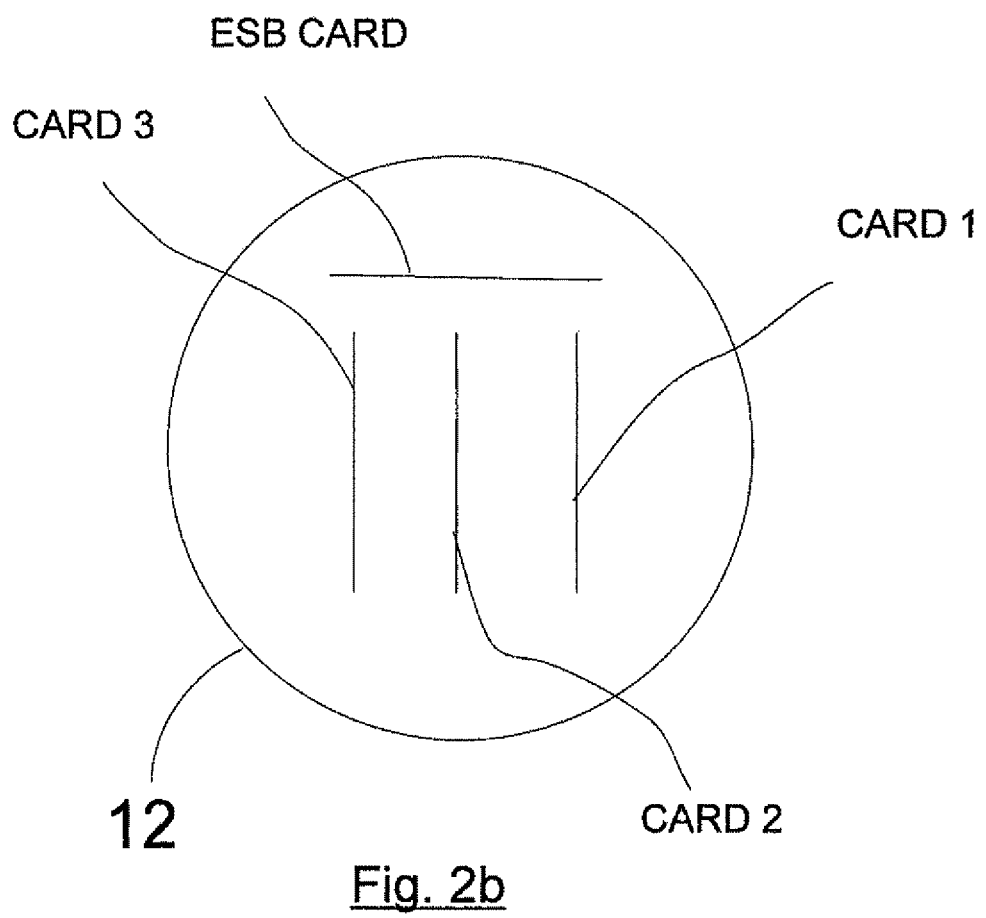
FIG. 2*b* schematically shows a cross-sectional view of the SEM of FIG. 2*a*.

FIGS. 2*a* and 2*b* schematically shows the physical layout of cards within an SEM housing 12. For clarity, only three cards (i.e. "CARD 1" to "CARD 3") are shown in each bay's card stack.

As shown in FIGS. 2*a* and 2*b*, each electronics card is substantially planar, and in each of bays 1 and 2, CARD 1 to CARD 3 are arranged in a stack such that the major faces of each card are substantially parallel to, and coaxial with, major faces of the other cards in the stack. The ESB card holding the ESB switch blades 6 is orientated relative to the stack such that its major faces are substantially parallel to the axis of the stack and orthogonal to the major faces of the cards within the stack and positioned such that the ESB card is substantially equidistant from each card within the stack.

SEM housing 12 is formed as an elongate cylinder, with a substantially circular cross section. Each stack is arranged with its axis orthogonal to the axis of the SEM housing 12.

As can be seen more clearly in FIG. 2*b*, each ESB card occupies a segment cross-section space that exists above or below the card stack when installed in the SEM housing 12.

Since the ESB cards sit above or below the respective card stacks, the distances between the ESB cards and the cards of each stack are minimized, so that capacitive coupling can be realised.

Positioning the ESB(s) above or below the card stack provides various benefits, including:
- Segregation of the capacitively-coupled LAN from the standard SEM backplane to enhance EMC performance;
- Reduction of the radiated and conducted susceptibility within the SEM;
- Segregation of the SEM LAN(s) from high speed digital from AC power lines, topside communications lines, high current switching functions and sensitive analogue cables;
- Restraining and minimizing of the LAN distribution and controlled impedance of printed tracks;
- Maximizing use of the volume within the SEM enclosure;
- Maximizing the SEM thermal management afforded to the ESB;
- Facilitation of the implementation of thermal provisions to effectively export heat away (via conduction) from the switches and associated power converters to the SEM chassis via an ESB support ladder metalwork and cover-plate metalwork. Effective thermal provisions are critical if the mean time to failure (MTTF) of the ESB function is to be optimized.

The above-described embodiment is exemplary only, and various modifications within the scope of the claims will be apparent to those skilled in the art.

For example, in an alternative configuration (not shown), the axis of the stacks may be parallel to the axis of the SEM housing 12.

The invention claimed is:

1. An electronic mode for use as a subsea electronic module for an underwater fluid extraction well, comprising:
   a housing;
   a first and a second local area network established within housing to enable communication within the electronic module, the first and second local area networks being segregated to provide redundancy, the first and second local area networks each including a plurality of interfaces with components of the networks;
   a switch contained within the housing, the switch operable to manage and route traffic on the first and second local area networks; and
   a plurality of bays contained within the housing, wherein:
   each of the plurality of bays contains a plurality of electronics cards and first and second Ethernet switches,
   each of the first and second Ethernet switches in each of the plurality of bays includes a first port, a second port and a plurality of additional ports;
   in each of the bays, the additional ports of the first Ethernet switch contained within the respective bay are coupled with respective ones of the electronics cards also contained within the same bay to provide connectivity with the first local area network;
   in each of the bays, the additional ports of the second Ethernet switch contained within the respective bay are coupled with the respective ones of the electronics cards also contained within the same bay to provide connectivity with the second local area network;

the first port of the first Ethernet switch of a first bay of the plurality of bays is coupled with the first port of the first Ethernet switch of a second one of the plurality of bays; and the second port of the second Ethernet switch of the first bay of the plurality of bays is coupled with the second port of the second Ethernet switch of the second one of the plurality of bays.

2. An electronic module according to claim 1, wherein the first and the second Ethernet switches in each of the plurality of bays are configured to provide system redundancy.

3. An electronic module according to claim 1, wherein couplings between the first Ethernet switch of the first bay and the first Ethernet switch of the second bay associated with the respective first ports, between such second Ethernet switch of the first bay and the second Ethernet switch of the second bay associated with the respective second ports, between the first Ethernet switch of the first bay and the respective ones of the electronics cards contained therein, between the second Ethernet switch of the first bay and the respective ones of the electronics cards contained therein, between the first Ethernet switch of the second bay and the respective ones of the electronics cards contained therein, and between the second Ethernet switch of the second bay and the respective ones of the electronics cards contained therein are capacitive couplings.

4. An electronic module according to claim 1, wherein each electronics card comprises a single board computer, the single board computer having a capacitive coupling to both the first and second local area networks.

5. An electronic module for use as a subsea electronic module for an underwater fluid extraction well comprising:
a housing;
a first and a second local area network established within the housing to enable communication within the module, the first and second local area networks being segregated to provide redundancy and each of the local area networks including a plurality of interfaces with components of the networks;
a switch contained within the housing, the switch operable to manage and route traffic on the first and second local area networks; and
a plurality of bays contained within the housing, each of the bays containing a plurality of electronics cards and first and second Ethernet switches, wherein:
each of the Ethernet switches comprises a first port, a second port and a plurality of additional ports;
in each of the bays, the additional ports of the first Ethernet switch are coupled with respective ones of the electronics cards to provide connectivity with the first local area network and the additional ports of the second Ethernet switch are coupled with respective ones of the electronics cards to provide connectivity with the second local area network; and
one of the first and second ports of the first Ethernet switch of each of the bays is coupled with one of the first and second ports of the first Ethernet switch of another one of the bays and one of the first and second ports of the second Ethernet switch of each of the bays is coupled with one of the first and second ports of the second Ethernet switch of the respective other one of the bays.

6. An electronic module according to claim 5, wherein couplings between the Ethernet switches and electronics cards associated therewith comprise capacitance couplings.

7. An electronic module according to claim 5, wherein couplings between the Ethernet switches located in separate bays comprise capacitance couplings.

8. A method of enabling Ethernet communication between Ethernet components within a subsea electronic module for an underwater fluid extraction well, the method comprising the steps of:
providing a first and a second local area network internally to a housing for the module to enable communication within the module, the first and second local area networks being segregated to provide redundancy and each of the local area networks including a plurality of interfaces with components of the networks;
providing a plurality of bays within the housing, each bay containing a plurality of electronics cards and a pair of Ethernet switches, each Ethernet switch of the pair of Ethernet switches within each respective one of the plurality of bays including a first port, a second port, and a plurality of additional ports;
in each of the bays:
coupling the additional ports of the respective first Ethernet switch with respective ones of the electronics cards in the respective bay to provide connectivity with the first local area network, and
coupling the additional ports of the respective second Ethernet switch with the respective ones of the electronics cards in the respective bay to provide connectivity with the second local, area network;
coupling one of the first and second ports of the first Ethernet switch of a first bay of the plurality of bays with one of the first and second ports of the first Ethernet switch of one of the other of the plurality of bays to provide bay-to-bay connectivity for the first local area network; and
coupling one of the first and second ports of the second Ethernet switch of the first bay of the plurality of bays with one of the first and second ports of the second Ethernet switch of the other of the plurality of bays to provide bay-to-bay connectivity for the second local area network.

9. A method according to claim 8, further comprising the steps of:
managing and routing traffic on the first and second local area networks with a switch; and
providing Ethernet interfacing between said Ethernet components within the subsea electronic module, said interfacing comprising capacitance coupling.

10. A method according to claim 8, wherein couplings between the Ethernet switches and electronics cards associated therewith comprise capacitance couplings.

11. A method according to claim 8, wherein couplings between the Ethernet switches located in separate bays comprise capacitance couplings.

12. A method according to claim 8, wherein the one of the other of the plurality of bays is a second bay of the plurality of bays, the method further comprising the steps of:
coupling one of the first and second ports of the first Ethernet switch of the first bay of the plurality of bays not coupling with the first Ethernet switch of the second bay, with one of the first and second ports of the first Ethernet switch of a third bay of the plurality of bays to further provide bay-to-bay connectivity for the first local area network; and
coupling one of the first and second ports of the second Ethernet switch of the first bay of the plurality of bays not coupling with the second Ethernet switch of the second bay, with one of the first and second ports of the second Ethernet switch of the third bay of the plurality of bays to further provide bay-to-bay connectivity for the second local area network.

\* \* \* \* \*